US009175156B2

(12) United States Patent
Prince et al.

(10) Patent No.: US 9,175,156 B2
(45) Date of Patent: Nov. 3, 2015

(54) SUSTAINABLE THERMOPLASTIC COMPOUNDS

(75) Inventors: Jack R. Prince, West Bountiful, UT (US); Jason D. Piunti, Cedarburg, WI (US)

(73) Assignees: PolyOne Corporation, Avon Lake, OH (US); Revolutionary Plastics, LLC, Las Vegas, NV (US)

( * ) Notice: Subject to any disclaimer, the term of this patent is extended or adjusted under 35 U.S.C. 154(b) by 0 days.

(21) Appl. No.: 14/344,043

(22) PCT Filed: Sep. 13, 2012

(86) PCT No.: PCT/US2012/055065
§ 371 (c)(1),
(2), (4) Date: Mar. 10, 2014

(87) PCT Pub. No.: WO2013/043454
PCT Pub. Date: Mar. 28, 2013

(65) Prior Publication Data
US 2014/0228498 A1  Aug. 14, 2014

Related U.S. Application Data

(60) Provisional application No. 61/537,457, filed on Sep. 21, 2011.

(51) Int. Cl.
| C08K 3/34 | (2006.01) |
| C08K 3/18 | (2006.01) |
| C08L 23/06 | (2006.01) |
| C08J 5/00 | (2006.01) |
| C08J 3/20 | (2006.01) |
| C08J 3/22 | (2006.01) |
| B29C 45/00 | (2006.01) |

(52) U.S. Cl.
CPC .. *C08L 23/06* (2013.01); *C08J 3/20* (2013.01); *C08J 3/22* (2013.01); *C08J 3/226* (2013.01); *C08J 5/00* (2013.01); *B29C 45/0001* (2013.01); *C08J 2323/06* (2013.01)

(58) Field of Classification Search
USPC .......................................................... 524/493
See application file for complete search history.

(56) References Cited

U.S. PATENT DOCUMENTS

| 3,981,840 | A | 9/1976 | Yamamoto et al. |
| 4,243,575 | A | 1/1981 | Myers et al. |
| 4,661,533 | A | 4/1987 | Stobby |
| 4,968,463 | A | 11/1990 | Levasseur |
| 5,177,139 | A | 1/1993 | Klaar et al. |
| 5,302,634 | A | 4/1994 | Mushovic |
| 5,366,365 | A | 11/1994 | Sullivan et al. |
| 5,369,147 | A | 11/1994 | Mushovic |
| 5,508,315 | A | 4/1996 | Mushovic |
| 5,552,455 | A | 9/1996 | Schuler et al. |
| 5,604,266 | A | 2/1997 | Mushovic |
| 6,242,098 | B1 | 6/2001 | Styron et al. |
| 6,269,952 | B1 | 8/2001 | Watt et al. |
| 6,344,268 | B1 | 2/2002 | Stucky et al. |
| 6,362,252 | B1 | 3/2002 | Prutkin |
| 6,379,797 | B1 | 4/2002 | Nikkeshi et al. |
| 6,583,217 | B1 * | 6/2003 | Li et al. .......................... 524/650 |
| 6,669,773 | B2 * | 12/2003 | Malloy et al. .................. 106/705 |
| 6,916,863 | B2 | 7/2005 | Hemmings et al. |
| 6,995,202 | B2 | 2/2006 | Lake, Jr. et al. |
| 7,195,473 | B2 | 3/2007 | Sullivan et al. |
| 7,241,818 | B2 | 7/2007 | Hemmings et al. |
| 7,879,939 | B2 | 2/2011 | Prince et al. |
| 8,106,105 | B2 | 1/2012 | Cernohous |
| 2002/0016224 | A1 | 2/2002 | Pasqua et al. |
| 2002/0040084 | A1 | 4/2002 | Colmar et al. |
| 2002/0185769 | A1 | 12/2002 | Hasegawa et al. |
| 2003/0032707 | A1 | 2/2003 | Hemmings et al. |
| 2004/0144287 | A1 | 7/2004 | Tardif et al. |
| 2004/0266933 | A1 | 12/2004 | Friedman et al. |
| 2006/0099405 | A1 | 5/2006 | Guiselin et al. |
| 2006/0276088 | A1 * | 12/2006 | DeWeese ......................... 442/59 |

(Continued)

FOREIGN PATENT DOCUMENTS

| AU | 2009200846 | 9/2009 |
| CN | 1894322 | 1/2007 |

(Continued)

OTHER PUBLICATIONS

Brandrup et al., Polymer Handbook, 4th edition, John Wiley & Sons, 1999, p. V/16.*
GRT-Pozzolans, Material Safety Data Sheet of Class C fly ash, Jan. 8, 2014.*
Huang et al. "Processed Low NOx Fly Ash as a Filler in Plastics" Journal of Minerals & Materials Characterization & Engineering, vol. 2, No. 1, pp. 11-31, 2003.
Chemistry & Industry (London, United Kingdom) (2010), (5), 24-26.
Deepthi et al. "Mechanical and thermal characteristics of high density polyethylene-fly ash cenospheres composites" Material and Design. vol. 31, pp. 2051-2060 (Oct. 2009).
ASTM D1238-10 Standard Test Method for Melt Flow Rates of Thermoplastics by Extrusion Plastometer—http://www.astm.org/Standards/D1238.htm, (4 pgs) (Date Unknown).

(Continued)

*Primary Examiner* — Hui Chin
(74) *Attorney, Agent, or Firm* — John H. Hornickel; Thom Rossa

(57) ABSTRACT

A thermoplastic compound is formed using a blend that includes one of processed fly ash, cinders and processed fly ash and cinders with a fractional melt having a melt flow index of less than 1 or a low melt resin with a melt flow index between 1 and about 3 or both, and a resin compatible with the fractional melt or low melt resin and having a melt flow index that is different from the melt flow index of the fractional melt or the low melt resin. Presence of the processed fly ash and cinders is believed to reduce cycle time for forming the thermoplastic compound into a plastic product from about 5 percent to about 30 percent merely because of the presence of the processed fly ash and cinders. Presence of the processed fly ash and/or cinders also permits the increased use of more fractional melt than conventionally attempted and also allows for use of thermoplastic regrind from recycling sources.

23 Claims, 1 Drawing Sheet

(56) References Cited

U.S. PATENT DOCUMENTS

| | | |
|---|---|---|
| 2008/0029925 A1 | 2/2008 | Brown |
| 2008/0114112 A1 | 5/2008 | Hemmings et al. |
| 2008/0119578 A1 | 5/2008 | Prince et al. |
| 2008/0131344 A1 | 6/2008 | Hill et al. |
| 2009/0258777 A1 | 10/2009 | Tardif et al. |
| 2011/0071252 A1 | 3/2011 | Prince et al. |
| 2011/0130501 A1 | 6/2011 | Prince et al. |
| 2011/0144243 A1 | 6/2011 | Prince et al. |
| 2011/0178198 A1 | 7/2011 | Backer et al. |
| 2014/0151924 A1 | 6/2014 | Prince et al. |

FOREIGN PATENT DOCUMENTS

| | | |
|---|---|---|
| CN | 101189292 | 5/2008 |
| EP | 0640650 | 7/1994 |
| EP | 0640650 | 3/1995 |
| EP | 0948410 | 10/1999 |
| GB | 2478696 | 9/2011 |
| JP | 2001261921 | 9/2001 |
| JP | 2001302809 | 10/2001 |
| WO | WO9937592 | 7/1999 |
| WO | WO 2008005143 | 1/2008 |
| WO | WO 2009136185 | 11/2009 |
| WO | WO2009136185 | 11/2009 |
| WO | WO 2011037865 | 3/2011 |
| WO | WO 2012121970 | 9/2012 |

OTHER PUBLICATIONS

Barnes et al., "Ash Utilisation from Coal-Based Power Plants," UK Department of Trade and Industry commissioned study, Jan. 2006 (30 pgs).

Berghahn, M., "Smart fly ash solutions," Evonik Industries, Science-to-Business Center Ecol, Eurocoalash May 28, 2010 (20 pgs).

Brennan, P., "Processing of Fly Ash—New Developments," Eurocoalash 2010, Copenhagen—May 28, 2010, Evonik Industries (Part 1—10 pgs).

Brennan, P., "Processing of Fly Ash—New Developments," Eurocoalash 2010, Copenhagen—May 28, 2010, Evonik Industries (Part 2—10 pgs).

Brennan, P., "Processing of Fly Ash—New Developments," Eurocoalash 2010, Copenhagen—May 28, 2010, Evonik Industries (Part 3—9 pgs).

Eurocoalash Conferences 2008 and 2010, downloaded from http://www.ecoba.com/eurocoalash.html, May 2, 2011 (1 pg).

Fujimo et al., "Experimental Investigation on the Thermal Conductivity Measurement of the Fly Ash Dispersed Plastic Composite Using Guarded Hot Plate Apparatus", 2007.

Heat Transfer—Japanese Research, vol. 36 Issue 7, Oct. 17, 2007, Wiley Periodicals, 3 Abstracts (3 pgs).

Nath et al., "Novel Observations on Kinetics of Nonisothermal Crystallization in Fly Ash Filled Isotactic-Polypropylene Composites", Published online Oct. 7, 2009 in Wiley.

"New plant makes additives from power station waste", Compounding World, Oct. 2009 (1 pg article).

Polyolefin Wikipedia Article (2 pgs) http://en.wikipedia.org/wiki/Polyolefin , May 2, 2011 last modified on Wikipedia.

RockTron Story, downloaded from http://rktron.com/company-history, Apr. 30, 2011 (2 pgs).

RockTron Legal Information, downloaded from http://rktron.com/legal-information, May 2, 2011 (2 pgs).

The RockTron Management Team, downloaded from http://rktron.com/management-team-2, Apr. 30, 2011(1 pg).

RockTron Collaboration & Innovation, downloaded from http://rktron.com/r-d-collaboration, Apr. 30, 2011 (1 pg).

RockTron Product Ranges, downloaded from http://rktron.com/products, Apr. 30, 2011 (2 pgs).

RockTron Technology Overview, IGEM 2010 (Part 1—20 pgs).

RockTron Technology Overview, IGEM 2010 (Part 2—20 pgs).

RockTron Technology Overview, IGEM 2010 (Part 3—20 pgs).

RockTron Technology Overview, IGEM 2010 (Part 4—18 pgs).

RockTron Technology Overview Presentation Slides, IGEM 2010 (78 pages) (Date Unknown).

Rohatgi et al., "Compressive and ultrasonic properties of polyester/fly ash composites", J Mater Sci (2009) 44:1485-1493.

Schut, "Fly-Ash Fille Stages a Comeback" Article, Plastics Technology, Sep. 1999 Issue (2 pgs).

Shoup, Chevron Phillips Chemical Company LP, "Injection Moulding Fractional Melt Index, High Density Polyethylene Materials", (17 pgs), (Date Unknown).

A. Brent Strong, "Plastics Materials and Processing", Third Edition, (21 pgs), 3rd Edition, Copyright 2006.

A. Brent Strong, "Fundamentals of Composites Manufacturing Materials, Methods, and Applications", Second Edition, (4 pgs) 2nd Edition, Copyright 1996.

Wong & Truss "Effect of Flyash Content and Coupling Agent on the Mechanical Properties of Flyash-Filled Polypropylene", Composites Science and Technology 52 (1994), 361-368.

Xanthos, "Functional Fillers for Plastics", Wiley-VCH Verlag GmbH & Co. KGaA, (89 pgs), Copyright 2005.

Chinese Office Action issued in related application No. 201180037024.9, dated Nov. 18, 2013 (4 pgs).

Chinese Office Action and translation submitted by the State Intellectual Property Office, issued on Apr. 15, 2010 (12 pgs).

Chinese Office Action and translation submitted by the State Intellectual Property Office, issued on Dec. 16, 2010 (7 pgs).

Chinese Office Action and translation submitted by the State Intellectual Property Office, issued on Mar. 16, 2011 (8 pgs).

Chinese Office Action and translation submitted by the State Intellectual Property Office, issued on Apr. 27, 2011 (10 pgs).

European Search Report issued in related application No. 11827112.1, dated Nov. 7, 2013 (7 pgs).

PCT Int Search Report and Written Opinion issued in PCT/US2012/055065, date of mailing Mar. 27, 2013 (10 pgs).

PCT Int Search Report and Written Opinion dated Dec. 28, 2012, issued in PCT/US20121039697 (15 pgs).

PCT International Preliminary Report on Patentability, date of mailing, Aug. 16, 2007 (4 pgs).

PCT International Preliminary Report on Patentability issued in related application No. PCT/US2012/039697, dated Dec. 12, 2013 (7 pgs).

PCT Int Search Report and Written Opinion issued in PCT/US2012/066641, date of mailing Feb. 19, 2013 (12 pgs).

International Preliminary Report on Patentability issued in corresponding application No. PCT/US2012/066641, dated Jun. 3, 2014 (9 pgs).

* cited by examiner

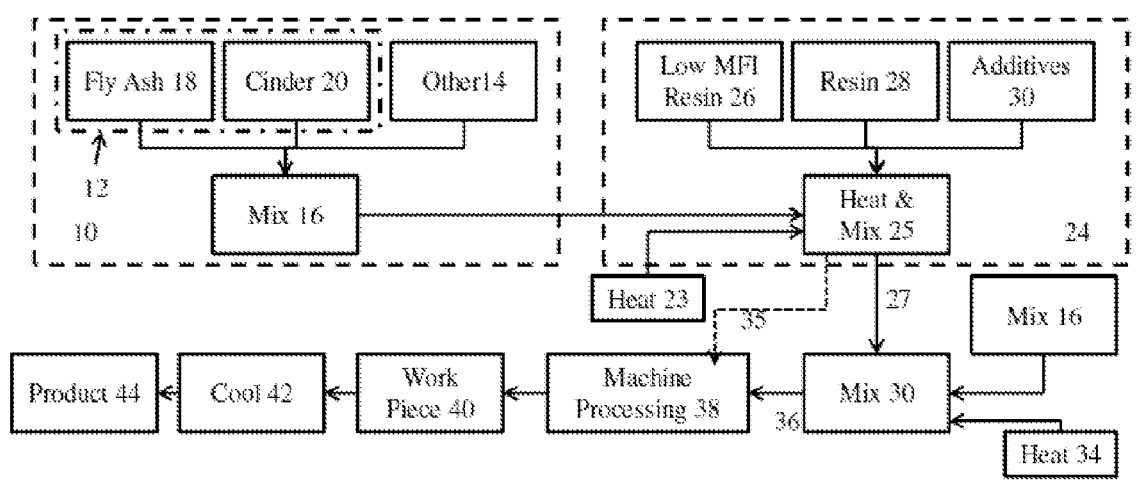

SUSTAINABLE THERMOPLASTIC COMPOUNDS

CLAIM OF PRIORITY

This application claims priority from U.S. Provisional Patent Application Ser. No. 61/537,457 filed on Sep. 21, 2011, which is incorporated by reference.

FIELD OF THE INVENTION

This invention relates to the use of inorganic filler that is combined with a thermoplastic to make sustainable thermoplastic compounds. More particularly, this invention relates to the use of a filler such as processed fly ash that is used with a plastic such as fractional melt and combined with a compatible resin that has a melt flow index that differs from that of the fractional melt.

BACKGROUND OF THE INVENTION

The use of fillers with resins is well known to reduce the use of the amount of resin, particularly thermoplastic resin, and to control mechanical properties of the resulting composition. Many resins are processed through injection molding machines, vacuum molding machines, roto molding machines, extrusion machines and the other similar machines. Typically the resin material is heated and mechanically processed in some way to form a desired structure that must be cooled or cool in some way to attain the desired mechanical characteristics for the desired product. Throughput or speed of production is an important issue that is addressed in selecting materials and machines for manufacturing a wide variety of thermoplastic materials.

Fly ash and cinders are by-products of the oxidation (e.g., combustion) of hydrocarbon fuels like coal. For example, power plants for generating electricity are known to generate substantial quantities of fly ash and cinders every day as they burn fossil fuels like coal and natural gas. Fly ash typically is composed of or includes some residual hydrocarbon that has not combusted along with unburned residue of materials that had been part of the fuel before it was burned. That is, the fly ash and cinders are the by-product, residue or result of a previous industrial process and thus can be referred to as a "post industrial" material which in this case is inorganic and, as discussed hereinafter, is useful as a filler. Processes and products that use a post industrial material are desired as one is, in effect, recycling.

The fly ash is so light or buoyant that it becomes entrained with the exhaust gases and moves up or "flies" up or out of the exhaust structure (e.g., a chimney). Typically, the fly ash is collected from the exhaust structure and stored, stockpiled and/or taken to suitable disposal sites. Some cinders are similarly quite light and small so they can be entrained with the fly ash. Some cinders can be of a larger size which typically fall to the bottom of a combustion structure and/or an exhaust structure. The fly ash and the cinders each can be separated into specific particle sizes.

U.S. Pat. No. 7,879,939 (Prince, et al.) (hereinafter the "'939 Patent"), which is incorporated by reference as if fully rewritten herein, discloses use of fly ash and cinders as a filler in the manufacture of plastics. To create suitable fly ash and cinder material from different sources, they can be processed to attain a desired particle size distribution (PSD) as suggested in U.S. Patent Publication US 2011/0071252 published on Mar. 24, 2011, (herein the '252 Application) the disclosure of which is incorporated by this reference. The PSD and cinder content can be controlled to vary processing parameters and the physical properties of a physical product made from selected resins which include thermoplastics. Inorganic fillers can also be processed as set forth in United States Patent Application for a METHOD TO HEURISTICALLY CONTROL FORMATION AND PROPERTIES OF A COMPOSITION, Ser. No. 61/491,091 filed May 27, 2011 (the "'091 Application").

The term "fractional melt" applies to one or more resins and other chemicals that have a melt flow index than is a fraction or less than 1.0. The melt flow index ("MFI") is a measure of the flow of a melt of a thermoplastic. Specifically it is the mass of the polymer flowing in ten minutes through a capillary of a specific diameter and length as outlined in standard ASTM D 1238 promulgated by the American Society for Testing and Materials.

A fractional melt having a weight percent from about 5% to 10% of a thermoplastic is not usually suitable for injection molding or processes that involve the flowability comparable to injection molding. Loading percentages higher than 5% to 10% weight percent can be achieved but only when processed at higher than normal processing temperatures of over 450° F. (232° C.) for polyolefins and at very high internal injection pressures as well. These higher than normal temperatures and pressures for fractional melt resins are known to cause degradation of the physical properties of the resulting products.

A "low melt" resin means a resin that has a melt flow index of about 3 or less and greater than 1 that functions comparably to a fractional melt resin.

For purposes of this invention, a "low index" resin may be "low melt" resin and/or a "fractional melt".

Products formed that include fractional melts and low melt resins with improved or acceptable physical properties and that require less energy to produce are not known.

SUMMARY OF THE INVENTION

A thermoplastic compound includes a blend, a low index resin and resin compatible with the low index resin and having a melt flow index that is different from the melt flow index of the low index resin. The blend includes an inorganic filler such as processed fly ash, cinders (from a combustion process), and the combination of processed fly ash and cinders. The compound can include other materials selected to control color and stickiness such as titanium dioxide, dyes, mineral oil, talc, and calcium carbonate.

Preferably, the low index resin is one or more thermoplastic. Desirably the resin has a melt flow index of greater than 1 g/10 minutes and less than 50 g/10 minutes. The low index resin can be regrind and can also be a combination of multiple resins all selected to have in combination a MFI of less than 3.0. It should also be noted that a low index resin can be a low melt resin having an MFI of less than 3 as well as a fractional melt resin.

The polymer for the low index resin and for the resin having a different MFI from the low index resin can be selected from the group consisting of polyolefins, polyamides, polyesters, poly (meth)acrylates, polycarbonates, poly(vinyl halides), polyvinyl alcohols, polynitriles, polyacetals, polyimides, polyarylketones, polyetherketones, polyhydroxyalkanoates, polycaprolactones, polystyrenes, polyurethanes, polysulfones, polyphenylene oxides, polyphenylene sulfides, polyacetates, liquid crystal polymers, fluoropolymers, ionomeric polymers, and copolymers of any of them and combinations of any two or more of them. If the polymers are different, they need to be compatible with each other so as to form essentially or effectively homogeneous thermoplastic compounds.

The thermoplastic compound can further include at least one of the following: adhesion promoters; biocides, anti-fogging agents; anti-static agents; bonding, blowing and foaming agents, anti-foaming agents, dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; or waxes.

In some compositions, the processed fly ash and cinders comprises from about 0.01 to about 95 weight percent of the compound. Also the fractional melt resin can comprise from about 0.5% to about 95% weight percent of the compound.

The processed fly ash is typically formed of a plurality of fly ash particles subjected to processing as described herein.

A method to form a plastic product includes mixing a blend of processed fly ash and cinders with a low index resin of either a fractional melt, a low melt resin, or both and also with a thermoplastic resin compatible with the low index resin and having a melt flow index that differs from the melt flow index of said low index resin, all to form a composition. The composition can be fully ready for use or it can be a master batch suitable for mixing with a final resin at the site. The master batch is preferably a melt that has been cooled. The final resin is selected to form a plastic material having desired mechanical properties. The plastic material is then processed by one of extrusion, molding, blow molding, vacuum molding, rotomolding, and calendering to form a plastic product.

Unexpectedly, the combination of processed fly ash and cinders with low index resins including fractional melt resin or low melt resins or both can lead to improved results with higher percent weight of thermoplastic and acceptable physical properties. The processed fly ash can comprise more than fifty percent (50%) of a thermoplastic compound, making it sustainable and respectful of the environment. Preferably, the combination can exceed fifty percent (50%) making the sustainable thermoplastic compound dominated by post-industrial content (e.g., processed fly ash and processed fly ash and/or cinders). Post consumer fractional melt resin reground and recycled can also be used as low index resin.

The use of processed fly ash is believed to enhance mixing and homogeneity of the low index resin and the other resin, which are themselves compatible. The composition of the invention allows those skilled in the art performing thermoplastic molding, extruding, or calendering operations to employ the lower melts of the low index resins at higher loadings than they otherwise would or could, even at lower temperatures. The processed fly ash and cinders do not tend to degrade the resins in the compound. The combination of the processed fly ash and cinders and the low index resin allow better mixing of those ingredients with the second, compatible resin, which is evident in the improved surface of the finished product compared to what it would look like with the same higher loadings of low index resin without the processed fly ash and cinders present.

BRIEF DESCRIPTION OF THE DRAWINGS

The following drawings depict only typical embodiments to illustrate the features and principles of the claimed inventions and therefore are not to be considered limiting of the scope of the appended claims. The invention will be described and explained with additional specificity and detail through the use of the accompanying drawings in which:

FIG. 1 is block diagram of a method of forming a product of the present invention.

EMBODIMENTS OF THE INVENTION

Low Index Resins

In the manufacturing plastic products, desired physical properties such as tensile strength, shear, impact, ductility, and the like, are typically controlled by selecting resins, fillers and other constituents that are known to produce a product with the desired properties. Also of concern is cycle time in the manufacturing process. The "cycle time" is typically the time it takes from when material is first introduced into the formation or manufacturing machine until it is physically stable and moveable. Shorter cycle time is generally preferred because more product is made per unit time. Some materials are selected to reduce cycle time and in turn increase productivity. Increased productivity reduces unit cost.

Fractional melts have a melt flow index under ASTM D1238 (American Society of Testing Materials) of less than 1 gram/10 minutes. Conventionally, known fractional melts, desirably polyethylenes, and preferably high density polyethylenes can only be used in thermoplastic compounds in an amount up to about five to ten weight percent (5% to 10%) of the thermoplastic compound without adversely affecting the pace of processing and ultimately, the quality of the ultimate product. Fractional melt, when mixed with a blend that includes an organic filler such as one of processed fly ash, cinders, and fly ash and cinders, and then mixed with other resins, mix better (i.e., more uniformity) and more quickly while yielding greater consistency in the mechanical properties of the final product than when fractional melt is used without an organic filler such as fly ash. In effect the blend of processed fly ash, cinders, and processed fly ash and cinders, functions as a "compatibilizer" (i.e., makes mixing faster and more homogeneous) also in effect leading to better mixing of the mixture before extrusion. Thus, use of fractional melt with such a blend leads to reduced cycle time and a reduction in energy to run the mixing and forming apparatus. Without the blend of processed fly ash, cinders, and processed fly ash and cinders, compositions having amounts of more than 10 wt. % of fractional melt are believed to have physical properties (e.g., strength, ductility, etc.) less than desirable. That is, plastic products heretofore could only include up to about 10 wt. % of thermoplastic fractional melt because processing parameters and physical properties were adversely impacted with higher amounts. As discussed more fully hereinafter, the amount of fractional melt can be increased to above fifty percent (50%) of the thermoplastic compound to be formed into a product when combined with the blend having the inorganic filler identified above. Therefore, in some cases where post consumer regrind fractional melt is used, the amount of virgin resin otherwise to be used can now be reduced while reducing energy consumption, increasing production rates, shortening cycle times and while maintaining substantially the same mechanical performance characteristics.

Low melt resin with a melt flow index of less than about 3 and greater than about 1 can also be used in the same beneficial manner as fractional melt resins. Low melt resins are more conventionally used as resins which reduced the overall melt flow of a thermoplastic compound. Together for purposes of this invention, they are identified as low index resins.

Fractional melt, such as post-industrial polyolefins are commercially available from a number of companies including NOVA Chemicals of Calgary, Alberta, Canada, Lyondell- Basell of Rotterdam, Netherlands, and Dow Chemical of Midland, Mich. These fractional melts are generally considered so undesirable as to be relegated to only the least expensive end product uses or else the landfill.

Low melt resins are only slightly more favored in the resin market. Such low melt resins are commercially available from a number of companies, including Dow Chemical, LyondellBasell, Chevron Phillips, and others.

Blend of Inorganic Filler

A suitable blend includes an inorganic filler that is selected from the group consisting of processed fly ash, cinders, and a combination processed fly ash and cinders.

Raw fly ash and cinders are by-products of coal combustion and have been found when properly treated ("processed" as identified in this invention) and selected as disclosed and discussed in the '252 Application and in the '939 Patent to be a valuable filler. That is, a suitable processed fly ash with and with out cinders can be identified to perform the function of reducing molding cycle times without the loss of physical properties of the resulting product. The fly ash so selected can be assembled and mixed to form a blend wherein the processed fly ash and cinders fall within the definition of Chemical Abstract Service (CAS) No. 71243-67-9.

Stated most generally, fly ash constitutes a multiplicity of small particles of a mineral composite formed during coal combustion that are carried out the exhaust (e.g., smoke stack) from the place of combustion. Stated most generally, cinders are other residue particulates formed during coal combustion, such as fused or vitrified matter. While large cinders fall out or down in the combustion zone, smaller cinders are found in varying levels mixed with or entrained in the fly ash particles. Preferred grades of fly ash and cinders have been processed according to the '252 Application and the '939 Patent have been evaluated a specific gravity of from about 1.6 to about 2.8.

Raw fly ash and cinders suitable for a variety of grades and treatments are typically found at fossil fueled electrical power plants and more particularly power plants that burn coal. However the physical and chemical composition of fly ash varies widely from power plant to power plant. A processing technique to prepare a consistent fly ash composition and a fly ash with cinder composition is disclosed in the '252 Application and can be used to form a dry blend of processed inorganic particles to form a "blend" which is then mixed or dispersed in a thermoplastic resin to form a master batch. The master batch is in effect a concentrate selected for later mixing with another or more resin(s).

Master batches should have from about 40% to about 95% by weight of processed fly ash and/or cinders to the weight of the master batch, desirably 60% to 81% by weight, and preferably 70% to 80% weight. The MFI can range from about 0.3 to about 150 and preferably from about 5 to about 10 g/10 min. Moisture can range from about 0.001% to about 2%. The specific gravity can range from about 1.6 to about 1.8 and preferably from about 1.74 to about 1.78. Some preferred master batches use about 25 weight percent MDPE (medium density polyethylene) as a carrier and contain about 75 weight percent of processed fly ash and cinders.

Any thermoplastic resin is a candidate for use with post-industrial inorganic filler and low index resin, particularly post-industrial fractional melt polyolefin, so long as the resin is compatible with the low index resin and the inorganic filler, and so long as the thermoplastic resin has a melt flow index of different from the fractional melt and preferably of 3 g/10 minute or more.

Non-limiting examples of suitable thermoplastic resins include polyolefins, polyamides, polyesters, poly (meth) acrylates, polycarbonates, poly(vinyl halides), polyvinyl alcohols, polynitriles, polyacetals, polyimides, polyarylketones, polyetherketones, polyhydroxyalkanoates, polycaprolactones, polystyrenes, polyurethanes, polysulfones, polyphenylene oxides, polyphenylene sulfides, polyacetates, liquid crystal polymers, fluoropolymers, ionomeric polymers, and copolymers of any of them and combinations of any two or more of them.

Published literature exists to identify many commercial species of these categories of thermoplastic resins. Non-limiting examples of specific commercial thermoplastic resins include acrylonitrile butadiene styrene (ABS), polymethyl methacrylate (PMMA), cellulose acetate, cyclic olefin copolymer (COC), ethylene-vinyl acetate (EVA), ethylene vinyl alcohol (EVOH), polytetrafluoroethane (PTFE), ionomers, polyoxymethylene (POM or Acetal), polyacrylonitrile (PAN), polyamide 6, polyamide 6,6, polyamide-imide (PAI), polyaryletherketone (PAEK), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxybutyrate (PHB), polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polysulfone (PSU), polytrimethylene terephthalate (PTT), polyurethane (PU), polyvinyl acetate (PVA), polyvinyl chloride (PVC), polyvinylidene chloride (PVDC), and styrene-acrylonitrile (SAN).

These specific thermoplastic resins can be substituted and mixed in any combination suitable to any person having ordinary skill in the art.

The quality of the thermoplastic resin can be prime or virgin resin or reprocessed via recycling sometimes called regrind. The use of recycled thermoplastic resin further can reduce costs for the manufacturer and provides additional sustainable solutions for the environment.

As stated previously, the resin of the low index resin and the resin having a different MFI need to have compatibility sufficient to form a homogeneous blend of resins, one without distinct phases of the different resins. With the low index resin being compatible with the processed fly ash and cinders and also with the resin having the different MFI, a compatible composition is formed by this invention.

The compound of the present invention can include conventional plastics additives in an amount that is sufficient to obtain a desired processing or performance property for the compound or the final machine processed. That is, the compounds are processed from a raw material state to a product state by a variety of mechanical devices including injection molding machines, vacuum molding machines, roll molding machines, extrusion machines and the other similar machines. The amount of additive(s) to the compound is dictated by the mechanical process and should not be wasteful of the additive or be detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Table 1 shows the acceptable, desirable, and preferred amounts of ingredients in a thermoplastic compound suitable for use in forming a desired plastic product.

TABLE 1

| Ingredient Weight Percent | Acceptable | Desirable | Preferable |
|---|---|---|---|
| Inorganic Filler of Processed Fly Ash and Cinders | 1-65 | 5-45 | 10-32 |
| Low Index Resin (Fractional Melt or Low melt with MFI of less than 3 or both) | 1-40 | 20-40 | 30-40 |
| Thermoplastic Resin with MFI different from that of the Low Index Resin | 10-98 | 15-60 | 20-50 |
| Optional Additives | 0-20 | 1-20 | 2-20 |

One can form the compound using continuous or batch techniques, using extruders or mixers, respectively. Regardless of the manner of production, one having ordinary skill in the art should recognize that precautions may need to be taken against unnecessary wear of the extruding or mixing equipment because of the ceramic nature of the fly ash and/or cinders. In some applications, specialized surfaces can be used in those parts of the equipment to minimize wear that may be caused by the fly ash and/or cinders when making the compound. It is believed that once formed into a compound, the risk of undue wear and tear on production molding or extruding equipment is reduced, placing the care of equipment more upon the party preparing the compound and less on the purchaser of the compound who uses the compound for subsequent additional compounding and/or final article formation.

Referring to FIG. 1, a block diagram shows that a blend 10 is formed from an organic filler 12 mixed with other material 14 in a suitable fashion. In FIG. 1, the organic filler is fly ash 18 and cinders 20. As noted herein before, the organic filler 12 can be one of fly ash 18, cinders 20, and a combination of fly ash and cinders. The organic filler 12 can be blended or mixed with other additives 22 such as talc, calcium carbonate and even a colorant. More specifically, when the inorganic filler is one of fly ash, cinders, or fly ash and cinders, the filler is processed to create processed fly ash, processed cinders and/or processed fly ash and processed cinders first by sifting to remove impurities and contaminants and to produce a filler with a desired and specific particle size distribution that has been empirically selected to produce a product with desired physical properties. Before blending, the processed fly ash and cinders can also be processed through a demagnitizer to remove a selected amount of magnetite (particles with iron) to control, among other things, the color of the resulting composition. The processed fly ash blend 10 is delivered for incorporation with other materials to form a composition 24. That is, the processed fly ash blend 10 is heated if or as necessary and mixed 25 with a quantity of low index resin 26 which can be either a fractional melt or a low melt resin having an MFI of more than about 1 and less than about 3 or a mixture of both, another resin 28, and other additives 30 that can be in lieu of, or in addition to, the additives 14. The mixing 25 is typically a done with heat 23 so that the materials are mixed to form a melt 24 which is then extruded as a pellet or chip or the like which is the master batch 27. In some applications, the melt 24 is fed directly to the machine processing 38 as a formable compound 35.

The low index resin 26 in FIG. 1 is any resin with a melt flow index below about 3 and preferably below 1 and can be a regrind as well as a virgin resin (e.g, resin that has not had significant heat processing). The resin 28 is any material which has a melt flow index that differs from the low index resin 26 but is compatible with the low index resin to form a homogeneous composition and preferably has a melt flow index different from and preferably above that of either of the types of low index resin, the fractional melt and the low melt resin. In the illustrated embodiment, the low index resin 26 is expected to exceed 30% by weight of the master batch but if made into a fully compounded pellet, it could be 50% by weight or more. The resin can be any suitable thermoplastic including a polyolefin or other polymer. The other additives can be a colorant and strengtheners including other fillers.

Once the master batch 27 is prepared, it is transported (e.g., to another workplace) where it is mixed 30 with another resin 32 which would in this example be at the work place. The resin 32 could be any suitable material selected to have desired mechanical characteristics including PVC, polystyrene and the like. While it can be dry mixed, the mixing is typically done with heat 34 to form a liquid or melt 36 proximate a machine 38 for processing the melt 36. The preparation of compounded pellets is explained in the '939 Patent. The techniques described in '939 Patent as well as the '019 Application can be used with fly ash, cinders and fly ash and cinders in higher concentrations, in order to make a melt 36 with different physical properties.

The machine processing 38 can be effected using any one of a variety of machines as discussed herein after. Typically it is an injection molding machine or extruder. In that process a work piece 40 is created from the melt 36. While in solid form, it is typically hot or warm so that it is taken to a separate location to cool 42 further toward ambient or close to ambient. After cooling, the work piece 40 becomes the end product 44.

Alternatively to what is explained in the '939 Patent, mixing 30 can be by batch but is preferably in a continuous process. It can occur separately but typically takes place in an extruder that is elevated to a temperature that is sufficient to melt the polymer that is in effect the master batch 27 and resin 32.

For typical extruders, a pump like a screw pump is incorporated with it to effect the mixing and increase the pressure to urge the melt 36 through the extruder or other machine that restricts flow. The rheology of the melt is thus important. The more flowable the melt 36, the lower the energy needed to drive the melt thru the machine processing 38 like the extruder. Therefore, it is counterintuitive to use a low index resin, and especially a fractional melt, to make an extruded or molded or calendered thermoplastic article. It is the addition of the processed fly ash and cinders which makes it possible to use the lower cost low index resin and also achieve faster processing speeds, lower energy consumption, or both. Extruder (pump) speeds can range from about 50 to about 500 revolutions per minute (rpm), and preferably from about 100 to about 300 rpm. Typically, the output from the extruder is pelletized for later extrusion, molding, or calendering into polymeric articles.

Alternatively to what is explained in the '939 Patent, mixing in a batch process typically occurs in a Banbury or other batch mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion, molding, and calendering into polymeric articles.

Also alternatively to what is explained in the '939 Patent, mixing of the ingredients can occur at the beginning of the machinery used to shape the compound into a final plastic article, such as an extruder or an injection molding machine.

Shaping of the thermoplastic compound can occur in a variety of mechanical processing as including extrusion, molding, and calendering. The choice of machine can be determined taking into consideration the amount of post-industrial inorganic filler and post-industrial fractional melt. Processing begins with the melt-mixing as shown by the mixing 30 followed by reshaping by machine processing such as by extrusion, molding, and calendering, followed by natural or accelerated cooling to form the final plastic article desired.

In the case of molding, particularly injection molding, the reshaping step includes pressurized injecting, holding, and cooling steps before the plastic article is ejected, the cycle of which the time is being measured to determine cycle time. More specifically, the reshaping step comprises four substeps of (1) injecting the compound into a mold; (2) holding the compound in the mold to form the plastic article in the shape of the mold; (3) cooling the plastic article to permit the plastic article to be released from the mold while retaining shape of the mold; and (4) ejecting the plastic article. The time between commencement of the injecting substep (1) and commencement of the ejecting substep (4) is one cycle time. The cycle time can also be defined to include the cooling period 42 discussed with respect to FIG. 1. Using the master batch 27 as hereinbefore discussed, the cycle time of the process to form a product 44 is reduced from a little as about 5 percent to about 30 percent for a plastic product 44 compared with a cycle time between commencement of substep (1) and commencement substep (4) or the making of a product 44 that only contains the plastic resin without the inorganic filler present.

Moreover, it has been found that use of the fillers as disclosed in the '939 Patent and in the '019 Application along with post-industrial inorganic fillers such as fly ash, cinders, and fly ash and cinders, permits a much greater use of fractional melt and/or low melt resin than possible in compounds without the inorganic filler present. Also it permits use of increasing amounts of reground thermoplastic resin.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

The fly ash and/or cinders inorganic filler can replace as much as about 65% of the plastic resin without unacceptable loss of physical properties. With the cost of the fly ash and/or cinders possibly being less than the cost of the plastic resin being replaced, less expensive molded, extruded, or calendered plastic articles can be made, without unacceptable loss of physical properties or sacrifice of ultimate surface appearance.

Any number of plastic articles can be benefit from the use of fly ash and/or cinders and post-industrial fractional melt and/or low melt resin in the preparation of the polymer compound. Non-limiting examples of final plastic articles which can benefit from the invention include appliances (refrigerators, freezers, washers, dryers, toasters, blenders, vacuum cleaners, coffee makers, mixers); building and construction articles (fences, decks and rails, floors, floor covering, pipes and fittings, siding, trim, windows, window shutters, doors, molding, plumbing products, toilet seats, and wall coverings); consumer goods (power hand tools, rakes, shovels, lawn mowers, shoes, boots, golf clubs, fishing poles, and watercraft); electrical/electronic (printers, computer housings, business equipment, LCD projectors, mobile phones, connectors, chip trays, circuit breakers, and plugs); healthcare products (wheelchairs, beds, testing equipment, and packaging); industrial products (containers, bottles, drums, material handling, gears, bearings, gaskets and seals, valves, wind turbines, and safety equipment); packaging (food and beverage, cosmetic, detergents and cleaners, personal care, pharmaceutical and wellness); and transportation articles (automotive aftermarket parts, bumpers, window seals, instrument panels, consoles, under hood electrical, and engine covers).

A preferred means of using compounds of the invention is to have them introduced into the core sections of an extruded or molded article. For example, Prince et al. identified above describes how a fly-ash- and/or cinders-containing compound can be used in an extruded core section, which is full enclosed by a protective cladding, by manufacture using a co-extruder, to make a window shutter frame, louvers, or stiles or other elongated articles.

EXAMPLES

Comparative Example A

A commercially available plastic article was molded in an injection mold having a shot length of more than 0.9 meters using high density polyethylene (HDPE) having a 0.945 specific gravity and a MFI of approximately 4 g/10 minutes. The injection molding machine was operated in accordance with standard operating conditions for the molding of that particular style and shape of that plastic article. The applicable cycle time measured from commencement of the injecting step to commencement of the ejecting step was 72.5 seconds.

Example 1

The same plastic article was molded in the same injection molding machine operated in accordance with the same operating conditions but with a compound comprising 10 weight percent of a master batch being a blend of processed fly ash and cinders from Revolutionary Plastics LLC as disclosed in the '019 Application and processed according to the '252 Application and the '939 Patent bearing grade number LLH7506, 30 weight percent of fractional melt HDPE having a MFI of 0.35 g/10 minutes, 10 weight percent of HDPE regrind, and the remaining 50 weight percent of the same HDPE as used in Comparative Example A. Because HDPE was used for both resins, the overall composition was compatible as a homogeneous mix of ingredients. Overall, the inorganic fillers processed as disclosed in the '939 Patent or as disclosed in the '019 Application such as processed fly ash and/or cinders comprised 7.5% of the entire plastic article. The applicable cycle time measured was 65.5 seconds, a remarkable 9.65 percent improvement over the cycle time of Comparative Example A. The use of 7.5% of the processed fly ash made possible the 9.65 percent cycle time improvement of Example 1 over Comparative Example A, even though Example 1 also included the 30 weight percent of difficult-to-process but less costly low index resin.

The properties and appearance of the Example 1 plastic article were determined by the molder to be acceptable for commercial production. In other words, to a skilled observer, no change in appearance or end-use properties was noticeable.

Achieving almost 10% reduction in cycle time is a major advantage for the molder over the competition still making the plastic articles according to the composition of Comparative Example A. Moreover, the use of the fractional melt (a lower cost ingredient than virginal polyolefin) reduced the overall cost of the compound and increased the use of post-industrial content in a sustainable way.

Additionally, the injection molding machine was equipped with a meter for measuring energy consumption per unit molded. The plastic article of Comparative Example A consumed 0.52 kW per kg, but the plastic article of Example 1 only consumed 0.45 kW per kg which translated to a savings of $0.06 per plastic article molded, equaling an energy savings $60,000 per million units, at current energy costs.

Moreover, considering the 9.65% improvement of applicable cycle time of Example 1 over Comparative Example A, over only 24 hours, 128 more plastic articles could be made, all other factors being equal. That greater productivity extrapolates into 896 more plastic articles per week, 3840 per 30-day month, and 46,720 more per year.

In a commercial world where time is money and commercial production requires continuous improvement to remain competitive in a global economy, any reduction in cycle time without loss of physical properties is tremendous advantage to the molder who uses the compound of the present invention containing a blend of inorganic fillers of processed fly ash and/or cinders and post-industrial fractional melt and/or low melt resin. Almost 10% of cycle time improvement is gigantic.

The invention is not limited to the above embodiments. Rather those skilled in the art will appreciate the wide variety of thermoplastics can be suitable resins for forming the master batch and for mixing with the master batch. Similarly, while fly ash and cinders are presently the preferred inorganic filler, others can become known later and be used to practice the teachings of this disclosure.

What is claimed is:

1. A thermoplastic compound, comprising:
   a blend that includes a processed inorganic filler comprising processed fly ash and processed cinders;
   a low index resin that has a melt flow index that is less than 3; and
   a second resin compatible with the low index resin and having a melt flow index that is different from the melt flow index of said low index resin,
   wherein the processed fly ash is formed of a plurality of processed fly ash particles, and wherein at least 85% of the processed fly ash particles have a particle size distribution below about 280 microns.

2. The thermoplastic compound of claim 1 wherein said second resin has a melt flow index of 3 g/10 minutes or more.

3. The thermoplastic compound of claim 1 wherein said blend includes other materials selected to control color and stickiness.

4. The thermoplastic compound of claim 1 wherein said low index resin comprises a low melt resin, a fractional melt, or both.

5. The thermoplastic compound of claim 4 wherein said low melt resin is a combination of multiple resins all selected to have in combination a melt flow index less than 3.0 and greater than 1.0, and wherein the second resin has a melt flow index of 3 g/10 minutes or more.

6. The thermoplastic compound of claim 1 wherein said low index resin is regrind.

7. The thermoplastic compound of claim 1 wherein said low index resin comprises a low melt resin, a fractional melt, or both, wherein the low melt resin is a combination of multiple resins all selected to have in combination a melt flow index less than 3.0 and greater than 1.0, and
   wherein the fractional melt resin has a melt flow index of less than 1.0.

8. The thermoplastic compound of claim 5 wherein said each of the multiple resins is a polymer having a melt flow index of greater than 1 g/10 minutes and less than 50 g/10 minutes.

9. The sustainable thermoplastic compound of claim 5, wherein the low melt resin is selected from the group consisting of polyolefins, polyamides, polyesters, poly (meth)acrylates, polycarbonates, poly(vinyl halides), polyvinyl alcohols, polynitriles, polyacetals, polyimides, polyarylketones, polyetherketones, polyhydroxyalkanoates, polycaprolactones, polystyrenes, polyurethanes, polysulfones, polyphenylene oxides, polyphenylene sulfides, polyacetates, liquid crystal polymers, fluoropolymers, ionomeric polymers, and copolymers of any of them and combinations of any two or more of them.

10. The thermoplastic compound of claim 1 wherein the processed fly ash has a melting point or of greater than about 1090° C.

11. The thermoplastic compound of claim 1 wherein the cinders have a melting point of greater than about 1090° C.

12. The thermoplastic compound of claim 1 wherein the processed fly ash and cinders have a specific gravity of from about 1.6 to about 2.8.

13. The thermoplastic compound of claim 1 wherein further comprising at least one of the following: adhesion promoters; biocides, anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; or waxes.

14. The thermoplastic compound of claim 1 wherein each of the processed fly ash and cinders comprises from about 0.01 to about 95 weight percent of the compound and wherein the low index resin comprises from about 0.5 to about 95 weight percent of the compound.

15. The thermoplastic compound of claim 1 wherein the processed fly ash is formed of a plurality of processed fly ash particles, and wherein at least 85% of the processed fly ash particles have a particle size distribution from about 0.2 microns to about 280 microns.

16. The thermoplastic compound of claim 1 wherein the low index resin is fractional melt with a melt flow index of less than one.

17. The thermoplastic compound of claim 1 wherein the low index resin is a low melt resin having a melt flow index of more than about one and less than about three.

18. A method of forming a plastic product, said method comprising the:
mixing, in the presence of heat, processed fly ash, processed cinders, a thermoplastic low melt resin having a melt flow index of less than about 3, and a second thermoplastic resin compatible with the thermoplastic low melt resin and having a melt flow index that differs from the melt flow index of said low melt resin, all to form a molten mixture; processing said molten mixture by one of extrusion, molding, blow molding, vacuum molding, roto molding, and calendering to form a plastic product, wherein the processed fly ash is formed of a plurality of processed fly ash particles, and wherein at least 85% of the processed fly ash particles have a particle size distribution from about 0.2 microns to about 280 microns.

19. A method of forming a plastic product, said method comprising the:
mixing, in the presence of heat, processed fly ash, processed cinders, a thermoplastic fractional melt having a melt flow index of less than about 1, and a second thermoplastic resin compatible with the fractional melt and having a melt flow index that differs from the melt flow index of said fractional melt, all to form a master batch;
forming an plastic material by mixing said master batch with a resin selected to form a product with desired mechanical properties; and
processing said plastic material by one of extrusion, molding, blow molding, vacuum molding, rotor molding, and calendering to form a plastic product,
wherein the processed fly ash is formed of a plurality of processed fly ash particles, and wherein at least 85% of the processed fly ash particles have a particle size distribution from about 0.2 microns to about 280 microns.

20. The method of claim 19 wherein the processed fly ash and processed cinders have a weight percent in the plastic article ranging from about 0.01 to about 95 weight percent and wherein the fractional melt comprises from about 0.5 to about 95 weight percent of the compound.

21. The method claim 19, wherein processing said plastic material includes:
injecting the plastic material into a mold;
holding the plastic material in the mold to form the plastic article in the shape of the mold;
cooling the plastic article to permit the plastic product to be released from the mold while retaining shape of the mold;
causing the plastic product to be removed from the mold;
positioning the plastic product at a location remote from the mold; and
cooling said plastic product to ambient at said location remote from the mold.

22. A plastic product made by the method of claim 18.

23. The method of claim 19 wherein said fractional melt is greater than 10 and less than 90 weight percent of the plastic material.

* * * * *